(12) United States Patent
Ordonio, Jr. et al.

(10) Patent No.: US 7,581,913 B2
(45) Date of Patent: Sep. 1, 2009

(54) SEAL NUT ASSEMBLY AND METHOD OF MANUFACTURE

(75) Inventors: Anthony Ordonio, Jr., Dublin, OH (US); John Eric Werling, Dublin, OH (US)

(73) Assignee: Honda Motor Company, Ltd., Tokyo (JP)

( * ) Notice: Subject to any disclaimer, the term of this patent is extended or adjusted under 35 U.S.C. 154(b) by 387 days.

(21) Appl. No.: 11/338,273

(22) Filed: Jan. 24, 2006

(65) Prior Publication Data

US 2006/0171794 A1  Aug. 3, 2006

Related U.S. Application Data

(60) Provisional application No. 60/646,871, filed on Jan. 25, 2005.

(51) Int. Cl.
*F16B 43/00* (2006.01)
(52) U.S. Cl. .................. 411/542; 411/533; 411/369
(58) Field of Classification Search .................. 411/533, 411/542, 369, 370, 371.1
See application file for complete search history.

(56) References Cited

U.S. PATENT DOCUMENTS

| | | | | |
|---|---|---|---|---|
| 1,393,459 A | * | 10/1921 | Smith | .................. 411/435 |
| 1,406,240 A | | 2/1922 | Sturt | |
| 1,552,702 A | | 9/1925 | Irish | |
| 1,723,621 A | | 8/1929 | Jewell | |
| 1,904,263 A | | 4/1933 | Berge | |
| 2,275,315 A | | 3/1942 | Ray | |
| 2,302,501 A | | 11/1942 | Mears | |
| 2,446,323 A | | 8/1948 | Davis et al. | |
| 2,485,794 A | | 10/1949 | Waterbury et al. | |
| 2,769,656 A | | 11/1956 | Lee | |
| 2,838,339 A | | 6/1958 | Schaldenbrand | |
| 2,882,090 A | | 4/1959 | Sewelin | |
| 2,883,232 A | | 4/1959 | Olley et al. | |
| 2,983,181 A | * | 5/1961 | Sholle | ............... 411/371.1 |
| 3,137,196 A | | 6/1964 | Stawinski | |
| 3,286,577 A | * | 11/1966 | Weidner, Jr. | ............... 411/542 |
| 3,399,589 A | | 9/1968 | Breed | |
| 3,411,816 A | | 11/1968 | Andrews et al. | |
| 3,519,279 A | * | 7/1970 | Wagner | ............... 411/542 |
| 3,557,654 A | | 1/1971 | Weidner, Jr. | |
| 3,588,787 A | * | 6/1971 | Kindell et al. | ............... 439/434 |
| 3,618,444 A | | 11/1971 | Kay et al. | |

(Continued)

FOREIGN PATENT DOCUMENTS

FR          2796674          1/2001

*Primary Examiner*—Flemming Saether
(74) *Attorney, Agent, or Firm*—Ulmer & Berne LLP

(57) ABSTRACT

A seal nut assembly includes a locking member, a bearing member, and a resilient member. The locking member defines a threaded aperture. The bearing member has an inner annular portion and an outer annular portion which radially circumscribes the inner annular portion. The inner annular portion comprises a first lower surface and defines an opening. The outer annular portion comprises a second lower surface which is stepped with respect to the first lower surface. The bearing member is disposed adjacent to the locking member such that the opening is aligned with the threaded aperture. The resilient member is attached to the second lower surface of the bearing member adjacent to the outer perimeter. A vehicle including a seal nut assembly and a method of manufacturing a seal nut assembly are also provided.

20 Claims, 11 Drawing Sheets

U.S. PATENT DOCUMENTS

| | | | |
|---|---|---|---|
| 3,882,752 A * | 5/1975 | Gutshall | 411/371.1 |
| 3,897,712 A | 8/1975 | Black | |
| 3,960,048 A | 6/1976 | Wagner | |
| 4,026,183 A * | 5/1977 | Bart | 411/542 |
| 4,041,834 A | 8/1977 | Herkes et al. | |
| 4,067,168 A | 1/1978 | Thurner | |
| 4,128,271 A | 12/1978 | Gray | |
| 4,162,098 A | 7/1979 | Richardson, III | |
| 4,193,434 A | 3/1980 | Wagner | |
| 4,206,931 A * | 6/1980 | Tomita et al. | 277/591 |
| 4,238,165 A | 12/1980 | Wagner | |
| 4,306,708 A * | 12/1981 | Gassaway et al. | 267/141.3 |
| 4,316,690 A | 2/1982 | Voller | |
| 4,373,842 A | 2/1983 | Bettini et al. | |
| 4,435,112 A | 3/1984 | Becker | |
| 4,437,784 A | 3/1984 | Peterson | |
| 4,472,861 A | 9/1984 | Joseph et al. | |
| 4,521,049 A | 6/1985 | Genma et al. | |
| 4,540,214 A | 9/1985 | Wagner | |
| 4,557,654 A | 12/1985 | Masuda et al. | |
| 4,572,568 A | 2/1986 | Kapp et al. | |
| 4,595,229 A | 6/1986 | Wagner | |
| 4,659,133 A | 4/1987 | Gower | |
| 4,708,559 A * | 11/1987 | Locotos | 411/545 |
| 4,729,606 A | 3/1988 | Narita et al. | |
| 4,732,519 A | 3/1988 | Wagner | |
| 4,740,026 A | 4/1988 | Wagner | |
| 4,768,822 A | 9/1988 | Gower | |
| 4,792,475 A | 12/1988 | Bien | |
| 4,850,633 A | 7/1989 | Emery | |
| 4,850,732 A | 7/1989 | Swanson | |
| 4,867,461 A | 9/1989 | Shimmell | |
| 4,887,950 A | 12/1989 | Sakayori et al. | |
| 4,934,856 A * | 6/1990 | Pauc | 403/24 |
| 4,934,888 A | 6/1990 | Corsmeier et al. | |
| 4,986,590 A | 1/1991 | Patti et al. | |
| 5,040,917 A | 8/1991 | Camuffo | |
| 5,085,550 A * | 2/1992 | Kendrick | 411/432 |
| 5,106,225 A | 4/1992 | Andre et al. | |
| 5,139,361 A | 8/1992 | Camuffo | |
| 5,150,940 A | 9/1992 | Kennedy | |
| 5,244,325 A | 9/1993 | Knohl | |
| 5,249,834 A | 10/1993 | Johnson et al. | |
| 5,267,820 A | 12/1993 | Sturtevant | |
| 5,308,133 A | 5/1994 | Mangum et al. | |
| 5,345,658 A | 9/1994 | Kennedy | |
| 5,513,934 A | 5/1996 | German | |
| 5,553,906 A | 9/1996 | Kunz | |
| 5,618,145 A * | 4/1997 | Kuo | 411/432 |
| 5,682,857 A * | 11/1997 | Briggs et al. | 123/456 |
| 5,730,486 A | 3/1998 | Jurica | |
| 5,827,025 A * | 10/1998 | Henriksen | 411/11 |
| 5,899,519 A | 5/1999 | Doshi | |
| 5,904,460 A * | 5/1999 | Kawabata | 411/155 |
| 5,906,463 A * | 5/1999 | Damm et al. | 411/369 |
| 6,027,294 A | 2/2000 | Newby | |
| 6,059,503 A | 5/2000 | Johnson | |
| 6,203,090 B1 | 3/2001 | Vitoorapakorn | |
| 6,238,127 B1 | 5/2001 | Jhumra et al. | |
| 6,244,807 B1 | 6/2001 | Garcia | |
| 6,280,132 B1 | 8/2001 | Szczukowski et al. | |
| 6,361,096 B2 | 3/2002 | Kim | |
| 6,394,537 B1 | 5/2002 | DeRees | |
| 6,702,365 B2 | 3/2004 | Semple et al. | |
| 6,854,921 B2 | 2/2005 | Melberg et al. | |
| 6,860,692 B2 | 3/2005 | Van Ingen et al. | |
| 6,883,859 B2 | 4/2005 | Edwards et al. | |
| 2005/0057075 A1 | 3/2005 | Edwards | |

* cited by examiner

SEAL NUT ASSEMBLY AND METHOD OF MANUFACTURE

RELATED APPLICATION

The present application claims priority of U.S. Provisional Application Ser. No. 60/646,871 filed Jan. 25, 2005 and hereby incorporates the same Provisional Application by reference.

TECHNICAL FIELD

The present invention relates to a seal nut assembly such as might be provided upon a vehicle.

BACKGROUND OF THE INVENTION

It is common to join together multiple components by inserting a threaded fastener, such as a screw or bolt, through aligned openings in the components and then installing a threaded nut onto the threaded fastener. Compressive force between a head of the threaded fastener and a confronting face of the nut acts to press and hold the components together. Seal-type nuts are conventionally employed to prevent fluids from flowing around the nut and into the aligned openings.

One conventional seal nut involves a cap nut attached (e.g., by crimping) to a flat washer and a concentric rubber seal bonded to a lower surface of the flat washer, as shown, for example, in FIG. 15. When this conventional seal nut is tightened against a mounting surface of a component being fastened, the bonded rubber seal becomes compressed between the flat washer and the mounting surface. In addition to providing clamping force, this compressed arrangement seals water from entering between the flat washer and the mounting surface. However, this conventional seal nut is vulnerable to losing clamping force and/or sealing ability when the rubber seal relaxes or experiences permanent compression deformation over time due to normal fatigue, environmental effects, aging, and/or exposure to variable loading. Compression deformation of the seal can allow fluid to penetrate the seal and can also result in a reduction of the clamp force exerted by the seal nut and the threaded fastener. In particular, if the seal is permanently deformed in a compressed state, a reduced amount of force will be exerted upon the components due to a reduced total thickness of the stack-up between the cap nut and the head of the threaded fastener (i.e., the stack-up comprises the components, the washer and the seal). In such circumstances, the nut must be continually and periodically manually retightened in order to restore the desired clamp force and sealing function.

SUMMARY OF THE INVENTION

In accordance with one embodiment of the present invention, a seal nut assembly is provided which comprises a locking member, a bearing member, and a resilient member. The locking member has a proximal end and a distal end spaced along a longitudinal axis. The locking member defines a threaded aperture extending along the longitudinal axis from the proximal end towards the distal end. The locking member is exteriorly provided with a grip surface. The bearing member is radially bounded by an outer perimeter and comprises an inner annular portion and an outer annular portion. The outer annular portion radially circumscribes the inner annular portion and extends to the outer perimeter. The inner annular portion comprises a first lower surface and defines an opening. The outer annular portion comprises a second lower surface which is stepped with respect to the first lower surface. The bearing member is disposed adjacent to the proximal end of the locking member such that the opening is aligned with the threaded aperture of the locking member. The resilient member is attached to the second lower surface of the bearing member adjacent to the outer perimeter of the bearing member.

In accordance with another embodiment of the present invention, a vehicle is provided which comprises a first component, a second component, a fastener, and a seal nut assembly. The first component has a first mounting aperture and the second component has a second mounting aperture. The fastener has a threaded shaft which is sized to be received by the first and second mounting apertures. The seal nut assembly is configured for selective engagement with the threaded shaft and comprises a locking member, a bearing member, and a resilient member. The locking member has a proximal end and a distal end spaced along a longitudinal axis. The locking member defines a threaded aperture extending along the longitudinal axis from the proximal end towards the distal end. The locking member is exteriorly provided with a grip surface. The bearing member is radially bounded by an outer perimeter and comprises an inner annular portion and an outer annular portion. The outer annular portion radially circumscribes the inner annular portion and extends to the outer perimeter. The inner annular portion comprises a first lower surface and defines an opening. The outer annular portion comprises a second lower surface which is stepped with respect to the first lower surface. The bearing member is disposed adjacent to the proximal end of the locking member such that the opening is aligned with the threaded aperture. The resilient member is associated with the second lower surface adjacent to the outerperimeter. The threaded shaft extends through the first and second mounting apertures and is threadably received in the threaded aperture of the locking member such that the second component is attached to the first component, and such that the resilient member and the first lower surface of the bearing member are in direct contact with the second component.

In accordance with yet another embodiment of the present invention, a seal nut assembly is provided which comprises a cap nut, a bearing member, and a resilient member. The cap nut defines a threaded aperture. The bearing member is attached to the cap nut and comprises an inner annular portion and an outer annular portion. The inner annular portion comprises a first lower surface and defines an opening. The opening is aligned with the threaded aperture. The outer annular portion radially circumscribes the inner annular portion and comprises a second lower surface. The second lower surface is stepped with respect to the first lower surface. The resilient member is attached to the second lower surface such that each of the resilient member and the first lower surface are configured to directly contact a mounting structure.

In accordance with still another embodiment of the present invention, a method of manufacturing a seal nut assembly is provided. The method comprises providing a cap nut having a threaded aperture and a lip. A bearing member is provided having an inner annular portion and an outer annular portion radially circumscribing the inner annular portion. The inner annular portion comprises an opening and a first lower surface and the outer annular portion comprises a second lower surface. The second lower surface is stepped with respect to the first lower surface. The lip is inserted into the opening provided in the inner annular portion. The cap nut is attached to the bearing member by crimping the lip at least partially around the opening. A resilient member is attached to the second lower surface.

In accordance with still another embodiment of the present invention, a seal nut is provided which comprises a cap nut, a washer and a seal. The washer is joined to the cap nut. The washer has a stepped outer perimeter portion and a generally planar inner annular portion. The seal is bonded to a lower surface of the outer perimeter portion of the washer. When the seal nut is installed onto a threaded member, the seal contacts a surface of an adjacent structure, thereby forming a fluid seal. The compressive force exerted by the seal nut is transmitted directly to the adjacent structure by the inner annular portion of the washer.

In accordance with still another embodiment of the present invention, a seal nut assembly is provided which comprises a locking member having a housing with a central opening and a cap enclosing an end of the central opening. A bearing member is proximate the locking member and has a central opening generally aligned with the central opening of the locking member. The bearing member has an inner annular portion which is generally planar and an outer annular portion which is generally planar. The inner and outer annular portions are offset from each other by a step portion. A resilient member is compressible and is attached to a lower surface of the outer annular portion of the bearing member. The resilient member is configured to form a fluid resilient member when the resilient member compressively engages an adjacent component. The inner annular portion of the bearing member is configured to incompressively engage the adjacent component.

In accordance with yet another embodiment of the present invention, a seal nut assembly is provided which comprises a metal locking member having a grip portion and a threaded central opening. A metal cap encloses an end of the central opening, and the locking member and the cap are formed as a single piece. A metal bearing member has a central opening generally aligned with the central opening of the locking member, a generally planar inner annular portion, and a generally planar outer annular portion. The inner and outer annular portions are offset from each other by a step portion, and the bearing member is joined to the locking member. A compressible resilient member is attached to a lower surface of the outer annular portion of the bearing member. The resilient member is configured to form a fluid resilient member when the resilient member compressively engages an adjacent component. The inner annular portion of the bearing member is configured to incompressively engage the adjacent component.

In accordance with yet another embodiment of the present invention, a method is provided for sealing aligned openings of joined components. The method comprises inserting a threaded fastener through the aligned openings. A seal nut assembly is threaded onto the threaded fastener and comprises a locking member joined to a bearing member. The bearing member has generally planar inner and outer annular portions which are offset from each other by a step portion. A compressible resilient member is joined to a lower surface of the outer annular portion. The resilient member compressively engages an adjacent component to form a fluid resilient member and the inner annular portion of the bearing member incompressively engages the adjacent component.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
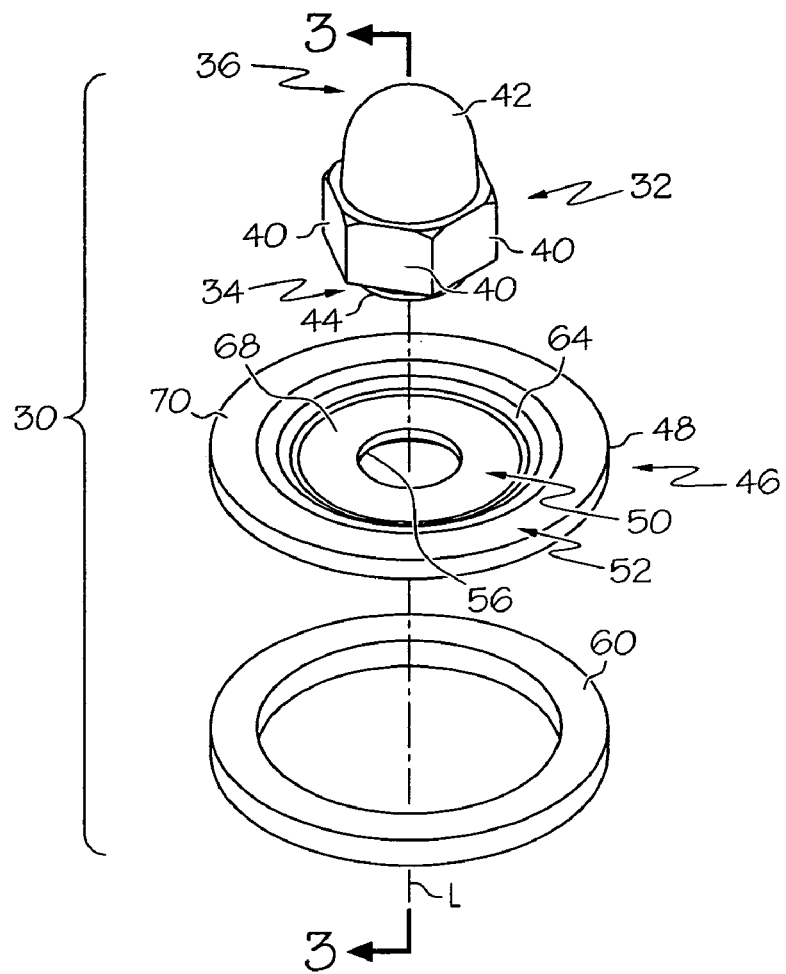
FIG. 1 is an exploded perspective view depicting a seal nut assembly in accordance with one embodiment of the present invention.

The present invention and its operation are hereinafter described in detail in connection with the views and examples of FIGS. 1-19, wherein like numbers indicate the same or corresponding elements throughout the views. These embodiments are shown and described only for purposes of illustrating examples of the elements of the invention, and should not be considered as limiting on alternative structures or assemblies that will be apparent to those of ordinary skill in the art.

A seal nut assembly (sometimes referred to herein as a "seal nut") in accordance with the teachings of the present invention can be used in conjunction with a fastener to compressively join two or more components. In particular, the seal nut assembly can assist in maintaining a relatively constant clamping force upon clamped components despite passage of time and/or variations in loading. Furthermore, the seal nut assembly can effectively and continually prevent penetration of moisture and/or other debris despite passage of time and/or variations in loading.

A seal nut assembly 30 in accordance with one embodiment of the present invention is depicted in FIGS. 1-4. The seal nut assembly 30 is shown to include a locking member 32, a bearing member 46, and a resilient member 60. The locking member 32 can extend from a proximal end 34 to a distal end 36 which are spaced along a longitudinal axis ("L"). The locking member 32 can comprise a cap 42 disposed adjacent to the distal end 36, and can accordingly constitute what is commonly referred to as a "cap nut" or an "acorn nut". The locking member 32 can comprise any of a variety of materials suitable to withstand the stresses and environmental conditions expected for the seal nut assembly 30. Such materials may include, for example, metals, plastics, and composites. The locking member 32 can have any of a variety of conventional finishes including, without limitation, electroplating or other plated finishes, paint and plastic coatings, or may remain unfinished. The locking member 32 may be fabricated using any of a variety of conventional processes including, for example, molding, casting, machining, forming, welding, adhering, fastening, and composite lay-up. In some embodiments, the cap 42 may be formed integrally with and from the same material as other portions of the locking member 32 (i.e., formed as one piece). In other embodiments, the cap 42 may be formed from a different material than other portions of the locking member 32, and/or may be formed separately from other components of the locking member 32 but attached thereto. For example, in some embodiments, the cap 42 can comprise a resilient plastic or elastomeric material that is configured to expand to receive a threaded fastener which is engaged or coupled thereto. In still other embodiments, the cap 42 may comprise a composite material.

Figure 2:
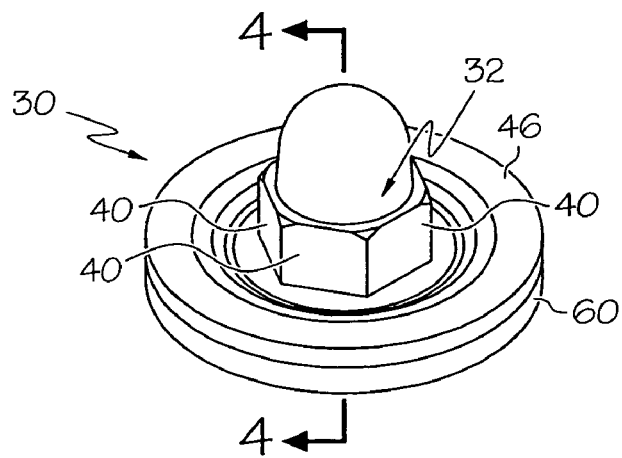
FIG. 2 is a perspective view depicting the seal nut assembly of FIG. 1 as assembled.
Figure 3:
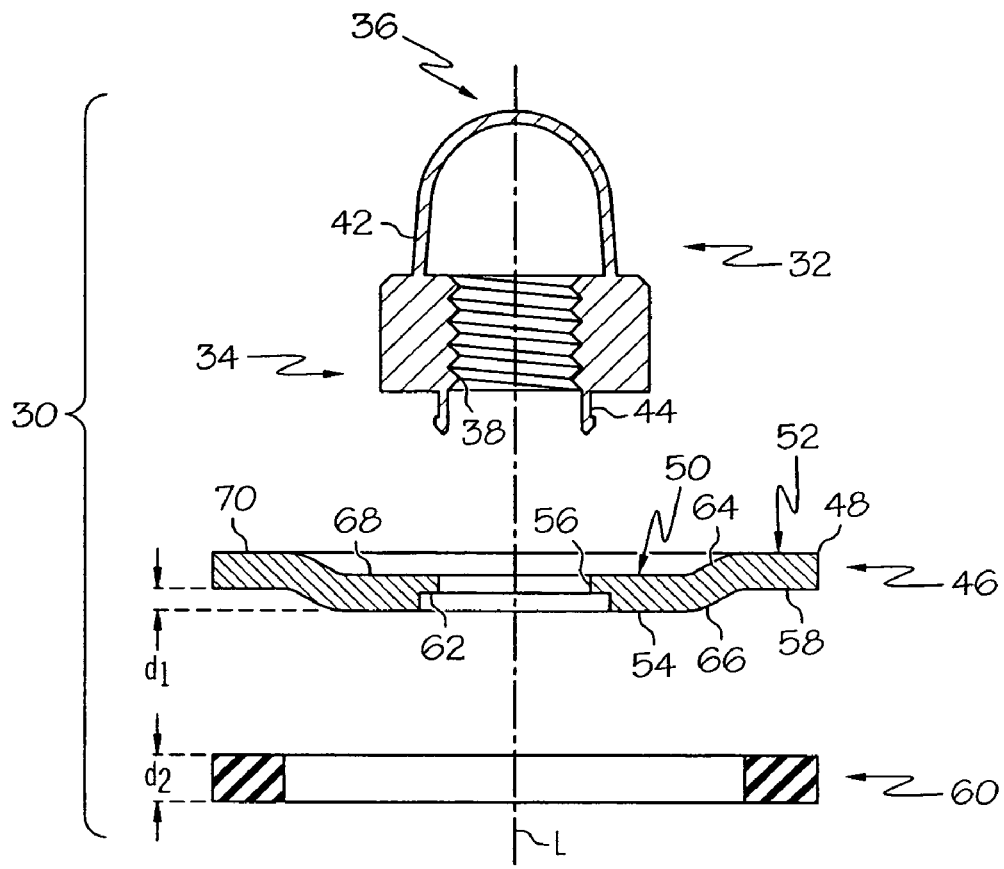
FIG. 3 is a sectional view depicting the seal nut assembly of FIGS. 1-2 taken along section lines 3-3 of FIG. 1.

As shown best in FIG. 3, a threaded aperture 38 can be formed within the locking member 32 and can extend at least partially from the proximal end 34 to the distal end 36. The cap 42 can provide an end to the threaded aperture 38. The locking member 32 can also be provided with a grip surface (e.g., having multiple driving flats 40), as best seen in FIGS. 1-2, which can facilitate gripping and tightening of the locking member 32 by a wrench or ratchet, for example. The locking member 32 can be hexagonal-shaped, as shown in FIGS. 1-2, although other shapes are certainly contemplated. Additionally, the locking member 32 can comprise a lip 44 extending adjacent to the proximal end 34. The bearing member 46 can comprise a ledge 62, wherein the lip 44 can be configured to engage the ledge 62 such that the locking member 32 and the bearing member 46 can be coupled together. In one embodiment of the present invention, the locking member 32 and the bearing member 46 can be coupled together or joined such that the locking member 32 does not readily rotate with respect to the bearing member 46. For example, this coupling can involve adhesives, crimping, brazing, welding, and/or soldering, or may occur such as when the lip 44 is tightly crimped against the ledge 62. However, it will be appreciated that the locking member 32 might alternatively be rotatably attached to the bearing member 46 (e.g., such as when the lip 44 is only loosely crimped against the ledge 62).

The bearing member 46 is shown to include an inner annular portion 50 and an outer annular portion 52. The outer annular portion 52 is sometimes referred to herein as an "outer perimeter portion", not to be confused with an "outer perimeter" (e.g., 48) to which the outer annular portion 52 or outer perimeter portion radially outwardly extends. The inner annular portion 50 can be generally planar, includes an opening 56, and is circumscribed by the outer annular portion 52. The outer annular portion 52 can be generally planar and can extend radially outwardly until reaching an outer perimeter 48. The bearing member 46 can have a first upper surface 68 corresponding to the inner annular portion 50 and a second upper surface 70 corresponding to the outer annular portion 52. An upper depending surface 64 can be provided between the first upper surface 68 and the second upper surface 70. It will be appreciated that the angle of the upper depending surface 64 relative to the first and second upper surfaces 68, 70 can be different in alternate embodiments of a seal nut assembly in accordance with the teachings of the present invention (e.g., see FIGS. 9, 10, and 12). Likewise, the bearing member 46 can include a first lower surface 54 corresponding to the inner annular portion 50 and a second lower surface 58 corresponding to the outer annular portion 52. A lower depending surface 66 can be provided to connect the first lower surface 54 with the second lower surface 58. It will also be appreciated that the angle of the lower depending surface 66 relative to the first and second lower surfaces 54, 58 can be different in alternate embodiments of a seal nut assembly in accordance with the teachings of the present invention (e.g., see FIG. 11).

The bearing member 46 can comprise any of a variety of materials suitable to withstand the stresses and environmental conditions expected for the seal nut assembly 30. Such materials may include, for example, metals, plastics, and composites. The bearing member 46 can have any of a variety of conventional finishes including, without limitation, electroplating or other plated finishes, paint and plastic coatings, or may remain unfinished. The bearing member 46 can be fabricated using any of a variety of conventional processes including, for example, molding, casting, machining, forming, punching, pressing and composite lay-up. In one embodiment, the bearing member can comprise a washer.

In the embodiment shown, the resilient member 60 (sometimes referred to herein as a "seal") has an annular shape. The resilient member 60 can be attached to the second lower surface 58 of the bearing member 46 in any of a variety of specific configurations. In one particular embodiment, it will be appreciated that the resilient member 60 can be adhesively attached or otherwise bonded (e.g., through molding) to the second lower surface 58 of the bearing member 46. In certain alternate embodiments, however, the resilient member 60 might be unattached but otherwise associated with the second lower surface 58 of the bearing member 46. The resilient member 60 can be formed from any of a variety of conventional materials which are suitable for use within the expected environmental conditions for the seal nut assembly 30 to seal against the flow of the types of fluids to which the seal nut assembly 30 is expect to be exposed. Such materials include, for example, polymers, foam, cork, natural rubber, synthetic rubber, leather, metal, lattices, polymers, elastomers and plastics. In one particular embodiment of the present invention, the resilient member 60 is formed from rubber.

Figure 4:
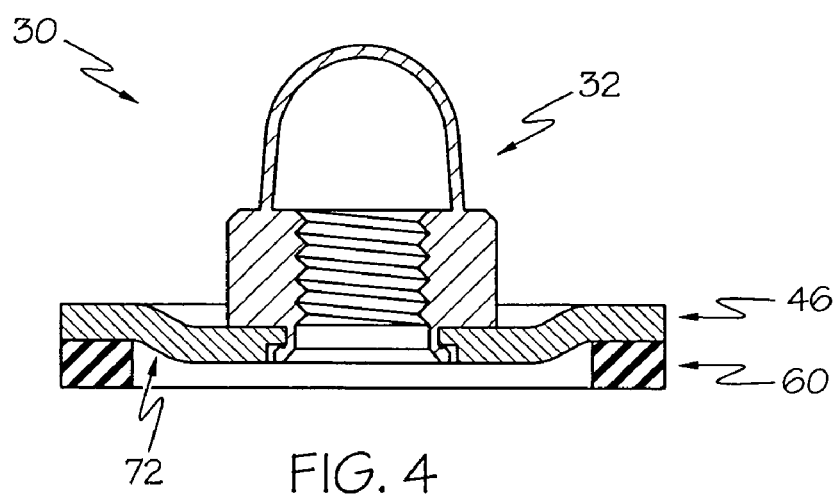
FIG. 4 is a sectional view depicting the seal nut assembly of FIGS. 1-3 taken along section lines 4-4 of FIG. 2.

A bearing member in accordance with the teachings of the present invention can have a stepped, offset, or relieved configuration such that at least part of its inner annular portion depends longitudinally further from the locking member than does any portion of its outer annular portion. For example, as shown in FIG. 3, the bearing member 46 is shown to have a stepped configuration whereby the first lower surface 54 depends further away from the locking member 32 along the longitudinal axis "L" than does the second lower surface 58. In particular, the first lower surface 54 is shown to be spaced from the second lower surface 58 by a distance $d_1$ (i.e., the depth of stepping). In certain embodiments of the present invention, as shown in FIG. 3, for example, the second lower surface 58 can be substantially parallel with the first lower surface 54. The resilient member 60, when in an uncompressed state, can have a thickness $d_2$, whereby the thickness $d_2$ is greater than the distance $d_1$. As shown in FIG. 4, even after the resilient member 60 is attached to the bearing member 46, an air gap 72 can remain at an annular position inwardly of the resilient member 60 and between the first lower surface 54 and the second lower surface 58 so as to accommodate any lateral expansion of the resilient member 60 during compression (as shown, for example, in FIG. 13). In one embodiment, as shown in FIG. 4, the resilient member 60 can have an opening which has a diameter at least as large as the outermost diameter of the inner annular portion 52. In another embodiment, as also shown in FIG. 4, the resilient member 60 can have an opening which has a diameter at least as large as the innermost diameter of the outer annual portion 52.

In order to assemble the seal nut assembly 30, the locking member 32 can be positioned such that the lip 44 is inserted into the aperture 56 of the bearing member 46. A flaring tool or other crimping device can then bend the lip 44 over the ledge 62 provided in the bearing member 46, such that the locking member 32 is attached to the bearing member 46. The resilient member 60 can then be adhesively attached to the second lower surface 58 of the bearing member 46.

In use, the seal nut assembly 30 can be threaded onto a threaded shaft of a fastener, whereby this fastener may be used to pull or draw one or more components together. In the particular example depicted in FIG. 13, the fastener 74 is shown to fasten a first component 80, a second component 82, and a third component 84, and in doing so, to pass through a mounting aperture 88 in the first component 80, a mounting aperture 90 in the second component 82, and a mounting aperture 92 in the third component 84. One or more wrenches can be used, for example, to tighten the seal nut assembly 30 onto the threaded shaft 78 of the fastener 74. In particular, one wrench might interface a head 76 of the fastener 74, while another wrench might contact one or more grip surfaces provided upon the locking member 32.

As the seal nut assembly 30 is tightened onto the fastener 74, the locking member 32 exerts a compressive force upon the bearing member 46 and, in turn, upon the second component 82. Likewise, the head 76 of the fastener 74 is in compressive contact with the third component 84. The first component 80 is sandwiched between the second and third components 82, 84. The resilient member 60 is compressed by force exerted against it by the outer annular portion 52 of the bearing member 46 and the second component 82. As the inner annular portion 50 of the bearing member 46 is placed into direct contact with the second component 82, the compressive force of the locking member 32 upon the second component 82 is not affected by deformation or compression of the resilient member 60, and is thus not susceptible to variation in compressive force due to deformation of the resilient member 60.

Hence, upon completion of this tightening process, the first lower surface 54 of the bearing member 46 is shown to contact a surface 86 of the second component 82. The resilient member 60 is shown to be compressed between the second lower surface 58 of the bearing member 46 and the surface 86, and to resultantly directly contact both the second lower surface 58 and the surface 86. It can be seen that, through tightening of the seal nut assembly 30 onto the threaded shaft 78 of the fastener 74, the resilient member 60 may extend laterally. This lateral expansion of the resilient member 60 may in some circumstances extend beyond the outer perimeter 48 of the bearing member 46, and/or may expand laterally inwardly into the air gap 72. Once fully tightened, the compressive force developed by the locking member 32 can be transmitted to the surface 86 of the second component 82 through the bearing member 46.

Since the bearing member 46 can be formed from steel, some other metal, or some other material having a low creep rate, it is unlikely that the bearing member 46 will sufficiently deform over time and/or in response to substantial forces so as to allow loosening of the fastened connection among the first component 80, the second component 82, and the third component 84. Furthermore, the inner annular portion 50 of the bearing member 46 can be sufficiently large so as to sufficiently broadly distribute any forces of the locking member 32 so as to prevent any significant creep in any of the first component 80, the second component 82, and/or the third component 84 as a result of the locking member 32 being tightened. The clamping force provided by the seal nut assembly 30 is therefore unlikely to diminish over time, even when significant load variations are encountered. Likewise, the sealing function of the seal nut assembly 30 is also unlikely to diminish in effectiveness over time. In particular, the resilient member 60 can remain consistently compressed between the bearing member 46 and the second component 82. Because forces experienced by the seal nut assembly 30 will not generally cause substantial movement of the bearing member 46 (including the outer annular portion 52), it is unlikely that the sealing properties of the resilient member 60 will be substantially deteriorated over time and/or will experience significant variations in compression. In this configuration, as the seal nut assembly 30 does not rely upon the resilient member 60 to transmit the compressive force of the locking member 32, the seal nut assembly 30 accordingly provides a solid mechanical connection as well as a reliable and long-lasting seal.

In one particular configuration, the locking member 32, in addition to being attached to the bearing member 46 with the lip 44 and the ledge 62, can be adhesively attached to the bearing member 46 such that any gap between the lip 44 and the ledge 62 can be sealed to prevent entry of water therein. It will be appreciated that coatings could alternatively be provided upon one or both of the lip 44 and/or the ledge 62 in order to effectuate this seal, and/or that the machined interface between the lip 44 and the ledge 62 can be sufficiently precise so as to prevent entry of water. It will further be appreciated that, in certain embodiments, it may not be necessary to seal any gap between the lip 44 and the ledge 62, as any water passing thereby could be sufficiently minimal as to not be problematic for the particular application.

Figure 16:
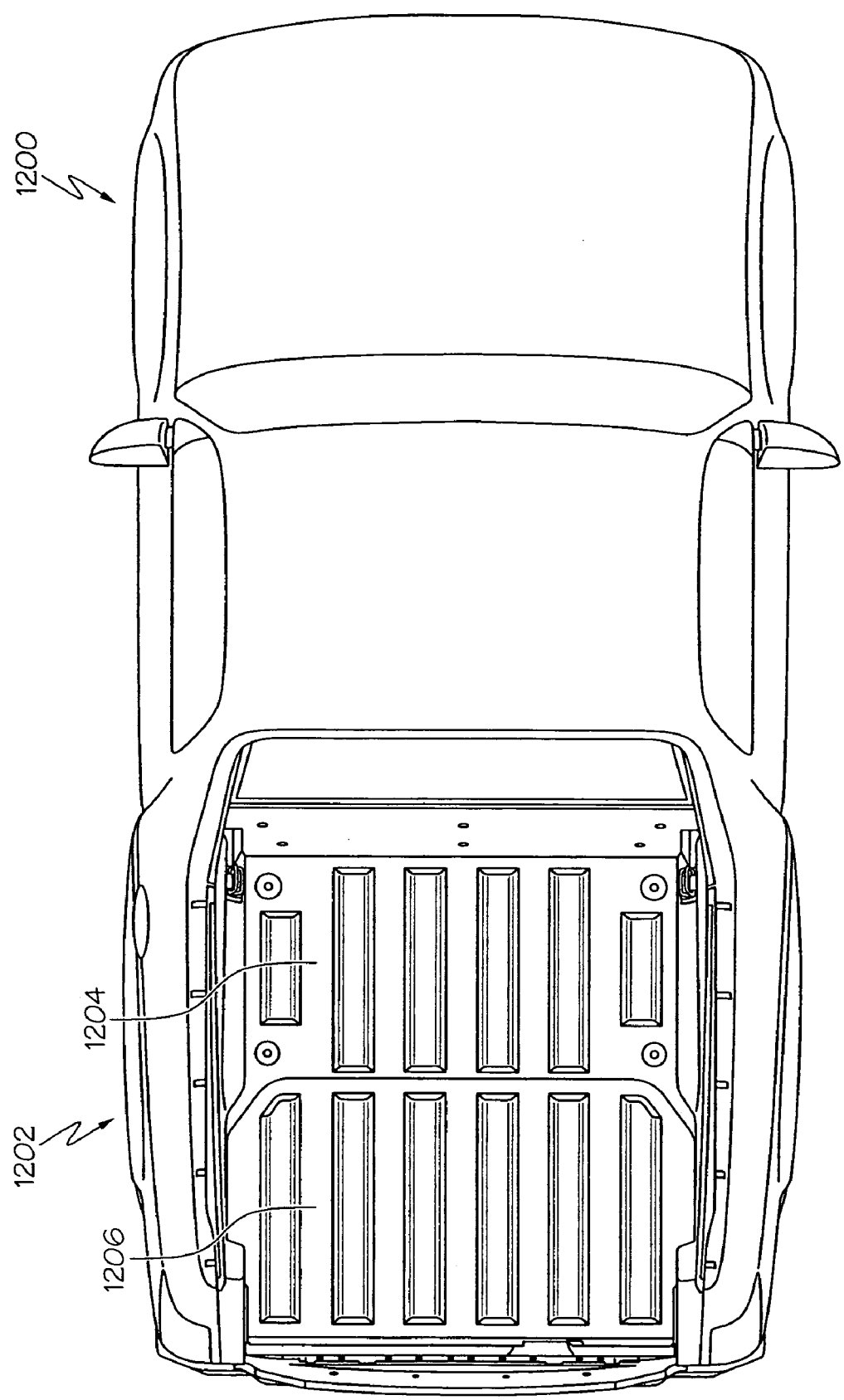
FIG. 16 is a top plan view depicting a pickup truck having a truck bed in accordance with one embodiment of the present invention.
Figure 17:
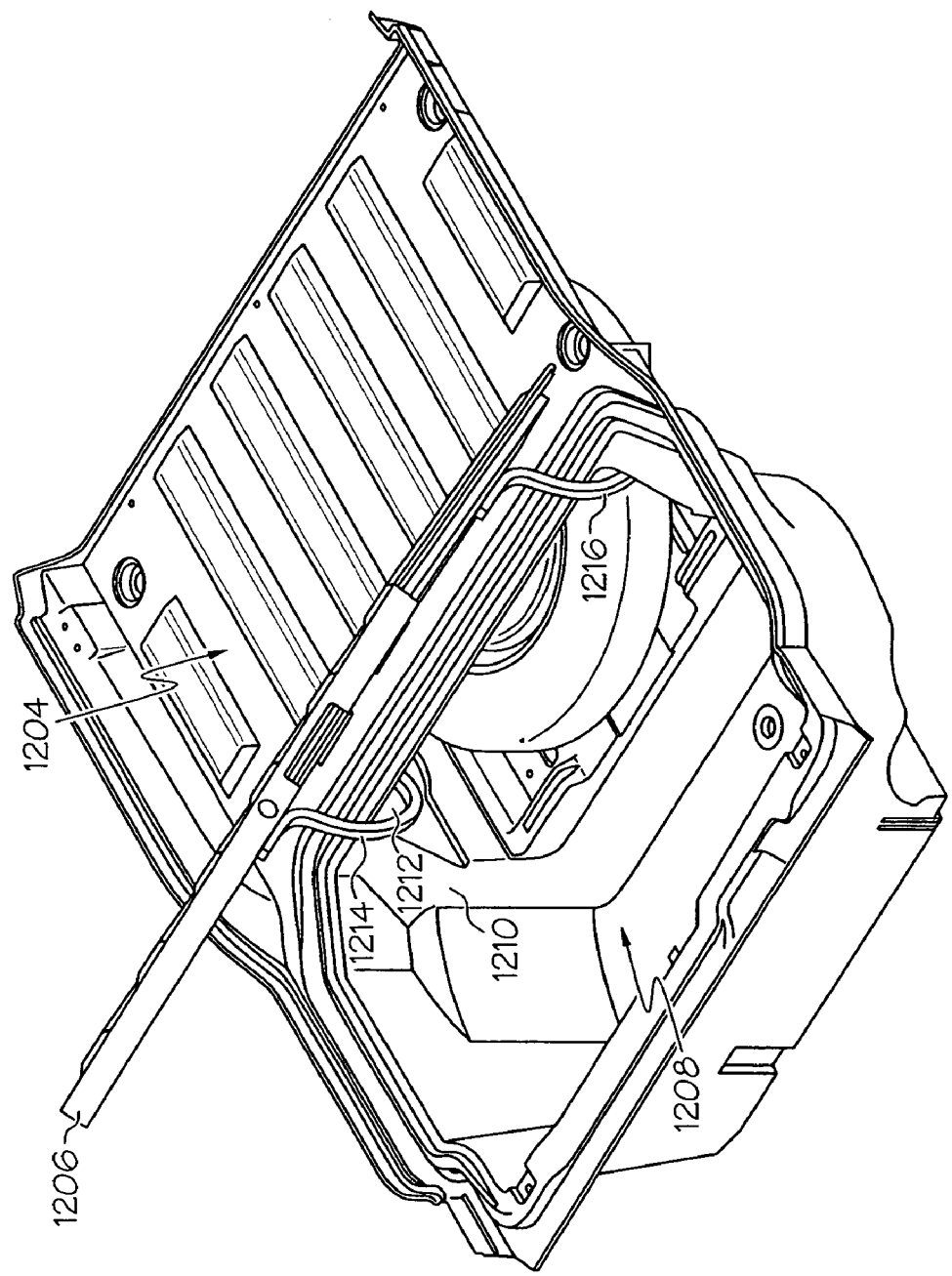
FIG. 17 is a perspective view depicting a portion of the truck bed of FIG. 16 wherein the truck bed portion has been removed from the pickup truck for clarity.
Figure 19:
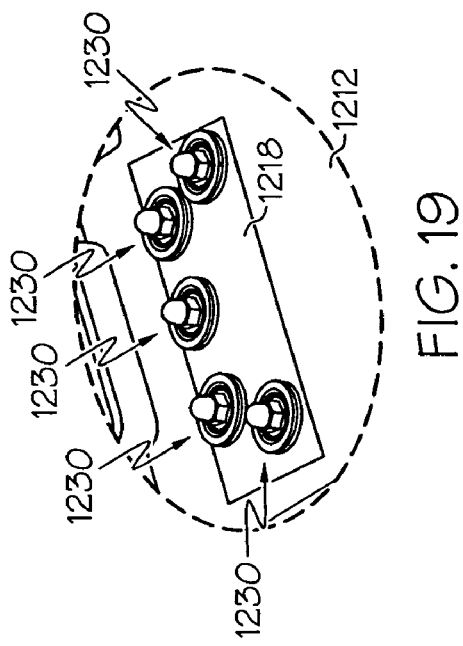
FIG. 19 is an enlarged view depicting a portion of FIG. 18.
Figure 18:
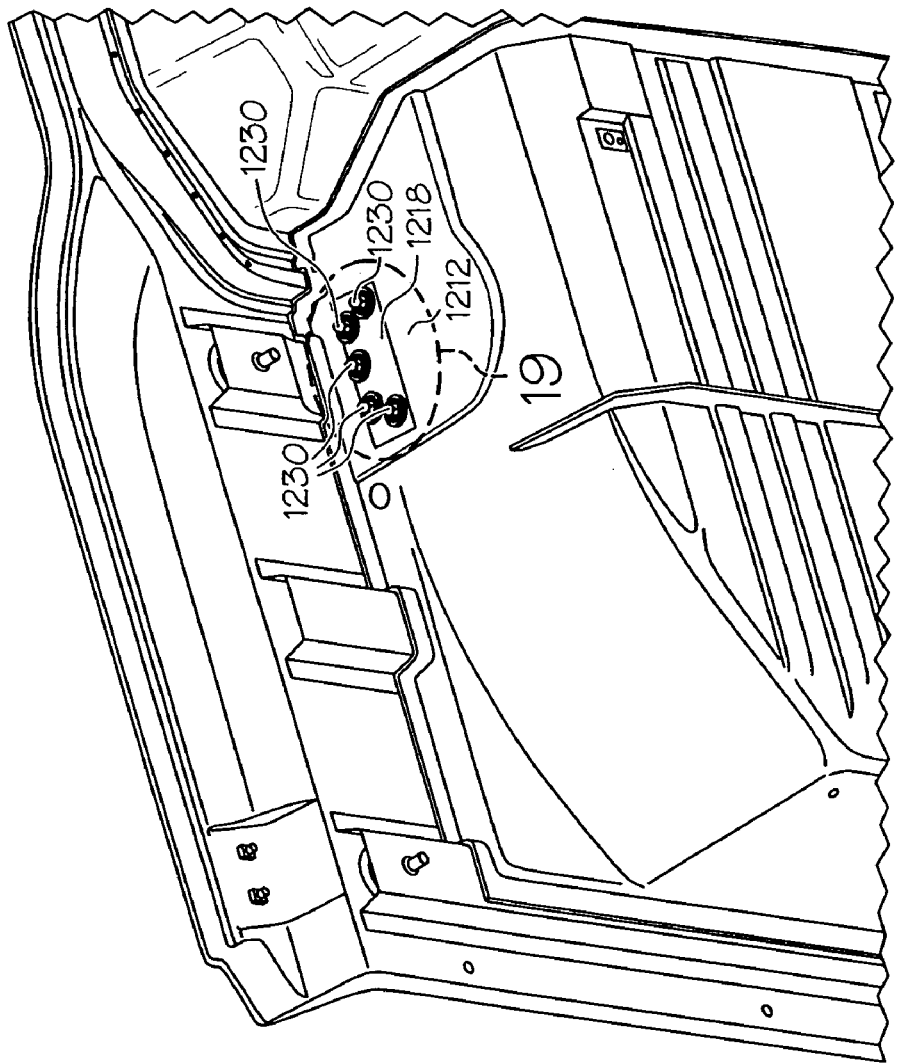
FIG. 18 is a perspective view depicting a portion of the underside of the truck bed portion depicted in FIG. 17.

A seal nut assembly in accordance with the teachings of the present invention can be used in any of a variety of specific applications. In one particular embodiment, the seal nut assembly can be used in conjunction with a truck bed of a pickup truck. For example, as depicted in FIG. 16, a pickup truck 1200 can include a truck bed 1202 having a bed floor 1204 and a closure member 1206. As shown in FIG. 17, the closure member 1206 can be opened to reveal a chamber 1208 disposed beneath the bed floor 1204 and the closure member 1206. The chamber 1208 can be generally defined by a shell 1210 which, among other surfaces, can include a side surface 1212. Hinges 1214 and 1216 can be provided to support the closure member 1206 with respect to the shell 1210, and in particular, the hinge 1214 can be attached to the side surface 1212. This attachment can be partially seen in FIG. 18 whereby fasteners (e.g., like 74 in FIG. 13) extending through the base of the hinge (e.g., like 84 of FIG. 13) can then pass through the side surface 1212 (e.g., like 80 in FIG. 13), and then through a plate 1218 (e.g., like 82 in FIG. 13). As shown in FIGS. 18 and 19, seal nut assemblies 1230 can be provided upon these fasteners to secure the plate 1218, the side surface 1212 and the hinge base with respect to each other. This arrangement can provide a secure and substantially watertight connection between the base of the hinge 1214 and the side surface 1212 of the shell 1210. In one particular embodiment, the side surface 1212 can comprise plastic, while the base of the hinge 1214 and the plate 1218 comprise metal. However, in other embodiments, all of these components might comprise plastic or metal, or may comprise any other combination of these materials or other materials. Furthermore, although the seal nut assembly is shown only in conjunction with a connection between a hinge and a shell, it will be appreciated that there are multiple other locations or uses for such a seal nut assembly on a pickup truck or other vehicle or device in accordance with the teachings of the present invention.

A seal nut assembly in accordance with the teachings of the present invention can be provided in any of a variety of alternative configurations. The use, function, and manufacture of these alternate seal nut assemblies, in many circumstances, will be similar to that described above with respect to the seal nut assembly 30, and in any event will be appreciated by those skilled in the art upon reading this disclosure.

Figure 5:
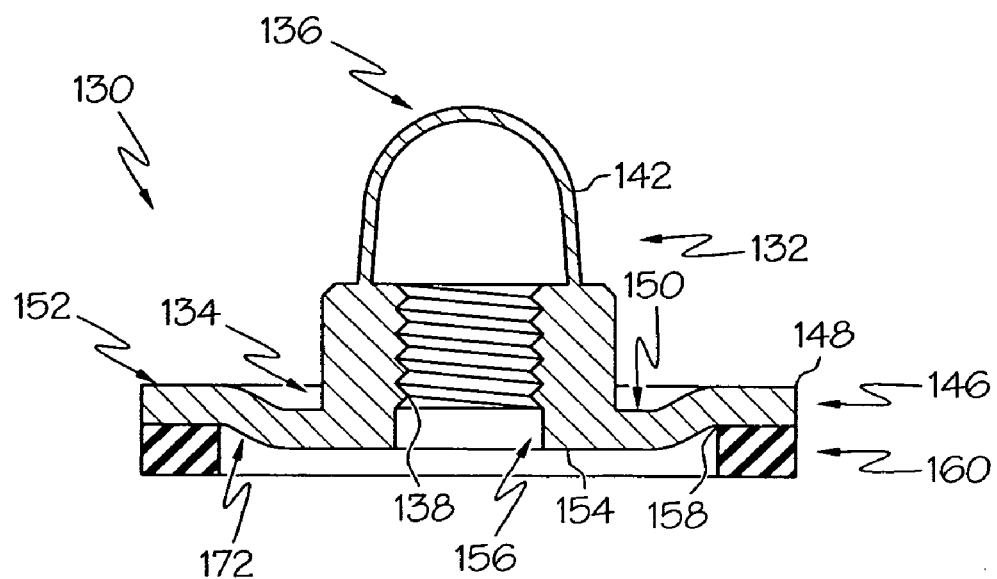
FIG. 5 is a sectional view depicting a seal nut assembly in accordance with another embodiment of the present invention.

FIG. 5 depicts an alternate embodiment of a seal nut assembly 130 comprising a locking member 132, a bearing member 146 and a resilient member 160. In this particular embodiment, the locking member 132 is shown to be integrally formed with the bearing member 146 (e.g., such as by machining, casting, or molding them as a single piece). The locking member 132 is shown to extend from a proximal end 134 to a distal end 136, whereby a cap 142 is provided adjacent to the distal end 136. The locking member 132 is shown to include a threaded aperture 138 such as for receiving a fastener through an opening 156 in an inner annular portion 150 of the bearing member 146. The bearing member 146 is also shown to include an outer annular portion 152 which extends radially outwardly until reaching an outer perimeter 148. The bearing member 146 has a first lower surface 154 and a second lower surface 158 which are shown to be arranged in a stepped configuration. The resilient member 160 can be attached (e.g., with adhesive) to the second lower surface 158, whereby an air gap 172 can remain so as to accommodate any lateral expansion of the resilient member 160.

Figure 6:
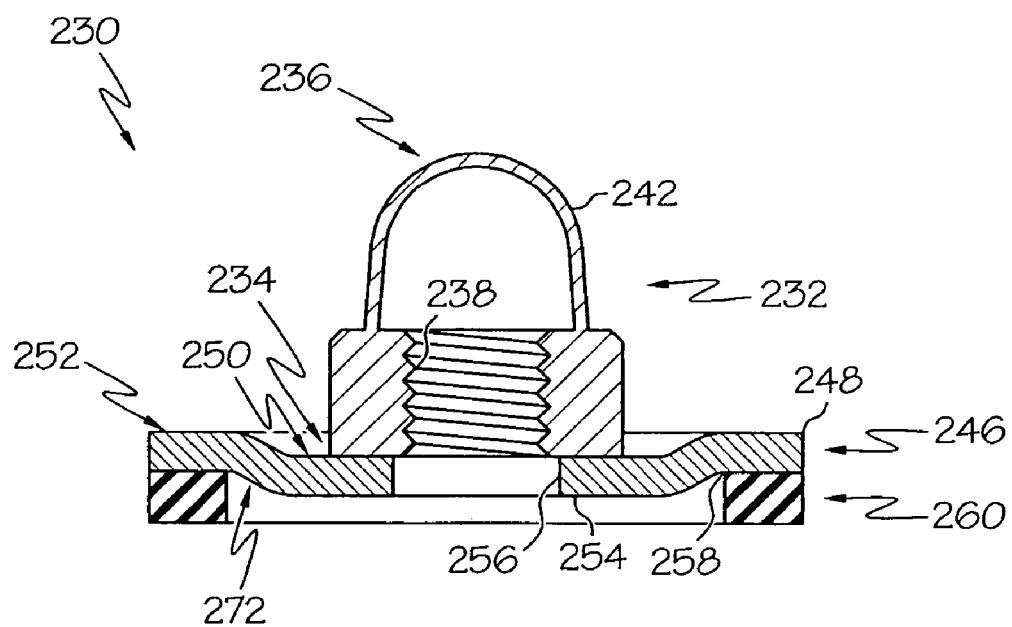
FIG. 6 is a sectional view depicting a seal nut assembly in accordance with yet another embodiment of the present invention.

In accordance with another embodiment of the present invention, a seal nut assembly 230 is depicted in FIG. 6. The seal nut assembly 230 is shown to include a locking member 232, a bearing member 246 and a resilient member 260. In this particular configuration, the locking member 232 is not attached to the bearing member 246, but may in some circumstances be provided with an adhesive or some other sealant to prevent the passage of water between the interface between the locking member 232 and the bearing member 246. The locking member 232 is shown to extend from a proximal in 234 to a distal end 236, and to include a threaded aperture 238 extending from the proximal end 234 towards the distal end 236. A cap 242 is shown to be provided upon the locking member 232 adjacent to the distal end 236. The bearing member 246 has an inner annular portion 250 and an outer annular portion 252. The inner annular portion 250 includes an opening 256 such as for receiving a threaded end of a fastener, while the outer annular portion 252 circumferentially surrounds the inner annular portion and extends radially outwardly until reaching an outer perimeter 248. The bearing member 246 includes a first lower surface 254 which generally corresponds with the inner annular portion 250, and furthermore includes a second lower surface 258 which generally corresponds with the outer annular portion 252. The resilient member 260 can be attached to the second lower surface 258 of the bearing member 246, whereby in some circumstances, an air gap 272 may remain.

Figure 7:
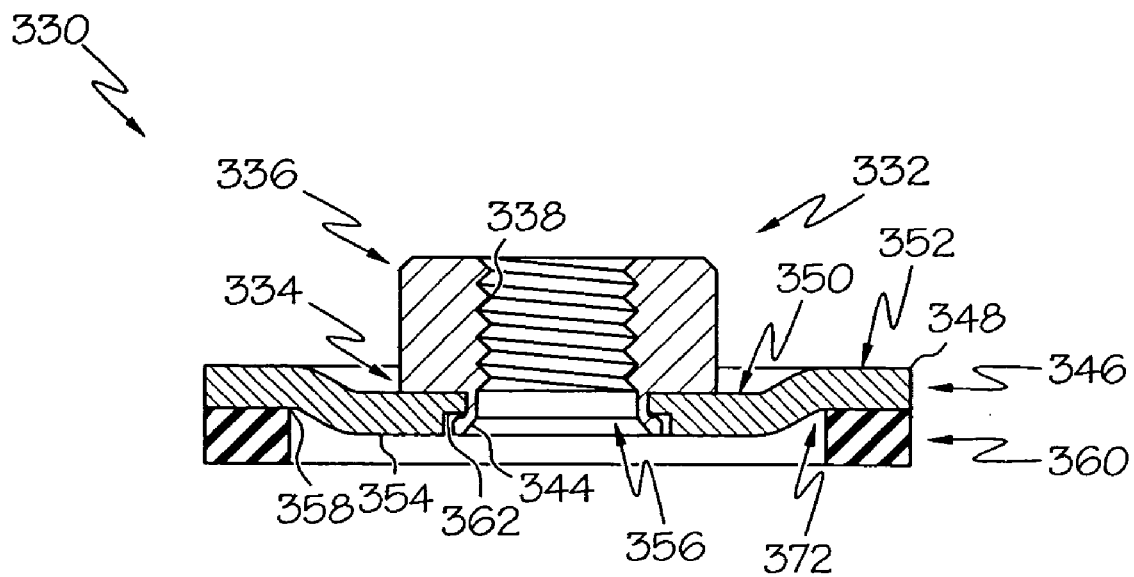
FIG. 7 is a sectional view depicting a seal nut assembly in accordance with still another embodiment of the present invention.

In accordance with yet another embodiment of the present invention, as shown in FIG. 7, a seal nut assembly 330 can include a locking member 332, a bearing member 346 and a resilient member 360. The locking member 332 can extend from a proximal end 334 to a distal end 336, and can include a threaded aperture 338 extending at least partially from the proximal end 334 to the distal end 336. A lip 344 is shown to be provided adjacent to the proximal end 334 and to pass through an opening 356 provided in an inner annular portion 350 of the bearing member 346. The lip 344 is also shown to be bent or crimped over a ledge 362 provided adjacent to the opening 356, so as to maintain a connection between the locking member 332 and the bearing member 346. The bearing member 346 can also include an outer annular portion 352 which radially circumscribes the inner annular portion 350 and extends radially outwardly until reaching an outer perimeter 348. The bearing member can further include a first lower surface 354 and a second lower surface 358 which are stepped with respect to each other. The resilient member 360 can be attached to the second lower surface 358. In some embodiments, an air gap 372 may be left to accommodate lateral expansion of the resilient member 360 which might be encountered during use of the seal nut assembly 330.

Figure 8:
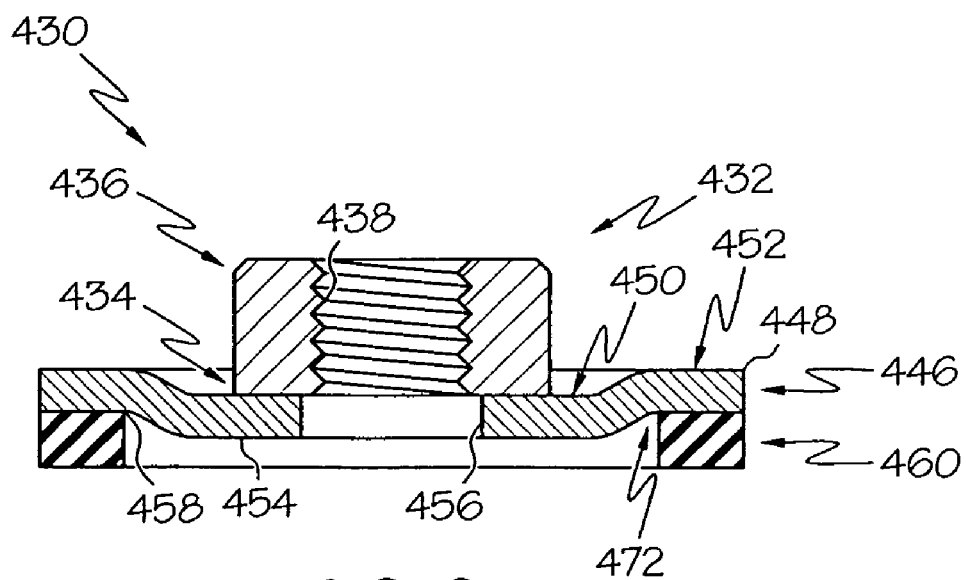
FIG. 8 is a sectional view depicting a seal nut assembly in accordance with yet another embodiment of the present invention.

In accordance with yet another embodiment of the present invention, as shown in FIG. 8, a seal nut assembly 430 is shown to include a locking member 432, a bearing member 446, and a resilient member 460. The locking member 432 can extend from a proximal end 434 to a distal end 436 and can have a threaded aperture 438 extending from the proximal end 434 to the distal end 436. The bearing member 446 can comprise an inner annular portion 450 and an outer annular portion 452, wherein the outer annular portion 452 radially circumscribes the inner annular portion 450 and extends radially outwardly until reaching an outer perimeter 448. An opening 456 can be provided in the inner annular portion 450 for receiving a threaded fastener directed toward the threaded aperture 438 of the locking member 432. The bearing member 446 can include a first lower surface 454 and a second lower surface 458, and the second lower surface 458 can be stepped with respect to the first lower surface 454. An air gap 472 can be provided to accommodate lateral expansion of the resilient member 460. It will be appreciated that adhesive, sealant and/or some other arrangement may or may not be provided to connect the locking member 432 with the bearing member 446, and/or to seal any interface between the locking member 432 and the bearing member 446.

Figure 9:
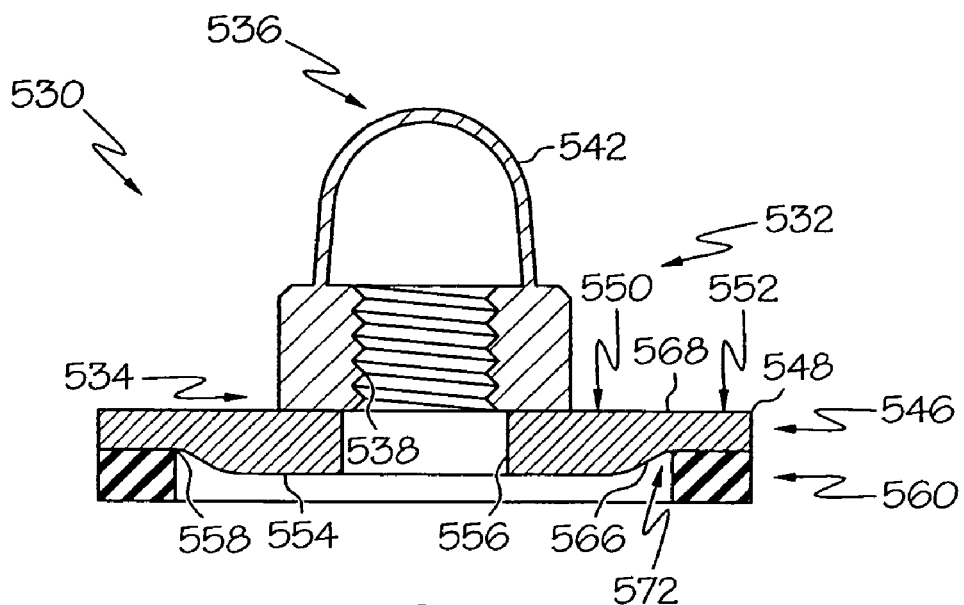
FIG. 9 is a sectional view depicting a seal nut assembly in accordance with yet another embodiment of the present invention.

FIG. 9 depicts yet another alternative seal nut assembly 530 in accordance with the teachings of the present invention. The seal nut assembly 530 is shown to include a locking member 532, a bearing member 546 and a resilient member 560. The locking member 532 is shown to extend from a proximal end 534 to a distal end 536, whereby a cap 542 is shown to be provided adjacent to the distal end 536. The locking member 532 can include a threaded aperture 538 extending from the proximal end 534 at least partially to the distal end 536. The bearing member 546 can include an inner annular portion 550 and an outer annular portion 552. The inner annular portion 550 can include an opening 556 for selectively receiving a threaded end of the fastener. The outer annular portion 552 can radially circumscribe the inner annular portion 550 and can extend radially outwardly until reaching an outer perimeter 548. The bearing member 546 is shown to have a first lower surface 554 corresponding to the inner annular portion 550 and a second lower surface 558 corresponding to the outer annular portion 552. The resilient member 560 is shown to be attached to the second lower surface 558 of the bearing member 546. A lower depending surface 566 is shown to connect the first lower surface 554 with the second lower surface 558, and is generally adjacent to an air gap 572 provided to selectively receive lateral expansion of the resilient member 560. In contrast to certain of the embodiments discussed above, the bearing member 546 is shown to include an upper surface 568 which remains generally flat and consistent throughout the interface between the inner annular portion 550 and the outer annular portion 552. It will be appreciated that adhesive, sealant and/or some other arrangement may or may not be provided to connect the locking member 532 with the bearing member 546, and/or to seal any interface between the locking member 532 and the bearing member 546.

Figure 10:
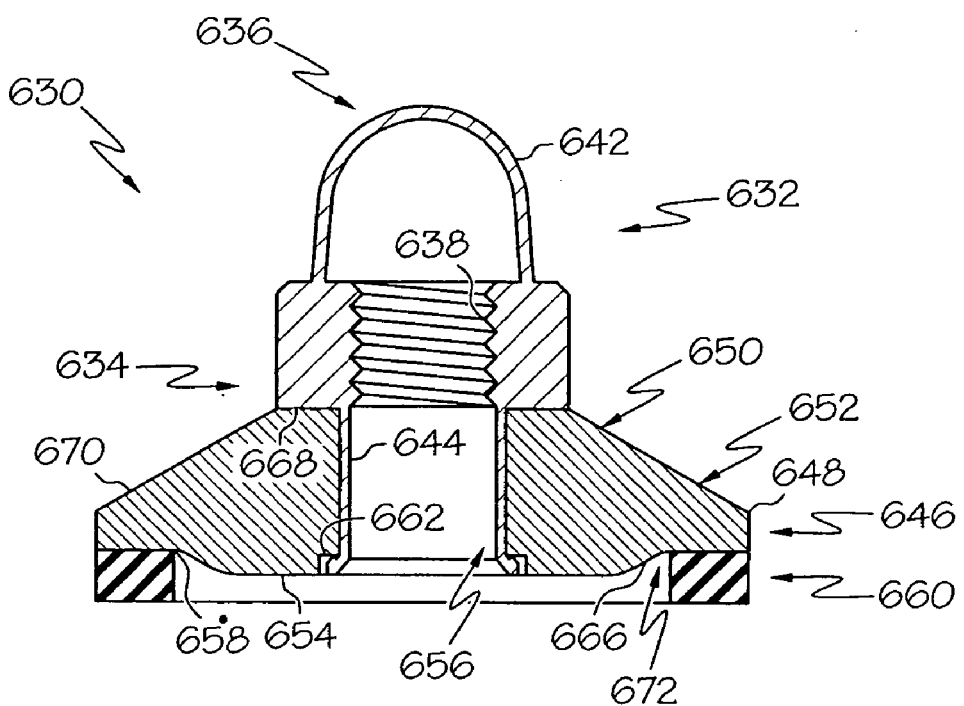
FIG. 10 is a sectional view depicting a seal nut assembly in accordance with still another embodiment of the present invention.

FIG. 10 depicts a seal nut assembly 630 in accordance with another embodiment of the present invention. The seal nut assembly 630 is shown to include a locking member 632, a bearing member 646 and a resilient member 660. The locking member 632 can include a proximal end 634 and a distal end 636. A cap 642 is shown to be provided adjacent to the distal end 636 and a lip 644 is shown to be provided adjacent to the proximal end 634. The locking member 632 can include a threaded aperture 638 for receiving a threaded end of a fastener. The bearing member 646 can include an inner annular portion 650 and an outer annular portion 652. The inner annular portion 650 can include an opening 656 for receiving the lip 644 and for further receiving a threaded end of a fastener. The locking member 642 can be attached to the bearing member 646 by crimping or otherwise bending the end of the lip 644 outwardly over and into a ledge 662 of the bearing member 646 provided adjacent to the opening 656. The bearing member 646 is shown to include a first lower surface 654 which corresponds with the inner annular portion 650, as well as a second lower surface 658 which corresponds with the outer annular portion 652. The outer annular portion 652 can radially circumscribe the inner annular portion 650 and can extend radially outwardly until reaching an outer perimeter 648. The first lower surface 654 can connect with the second lower surface 658 through a lower depending surface 666. The lower depending surface 666 can be generally adjacent to an air gap 672 provided to allow for receipt of lateral expansion of the resilient member 660. In one particular embodiment, the resilient member 660 can be attached to the second lower surface 658. The bearing member 646 depicted in FIG. 10 is shown to include a first upper surface 668 and a second upper surface 670, wherein the first upper surface 668 generally corresponds with the inner annular portion 650 and the second upper surface 670 generally corresponds with the outer annular portion 652. It will be appreciated that a bearing member constructed as depicted in FIG. 10 can provide greater rigidity than can a bearing member provided in certain of the aforementioned embodiments.

Figure 11:
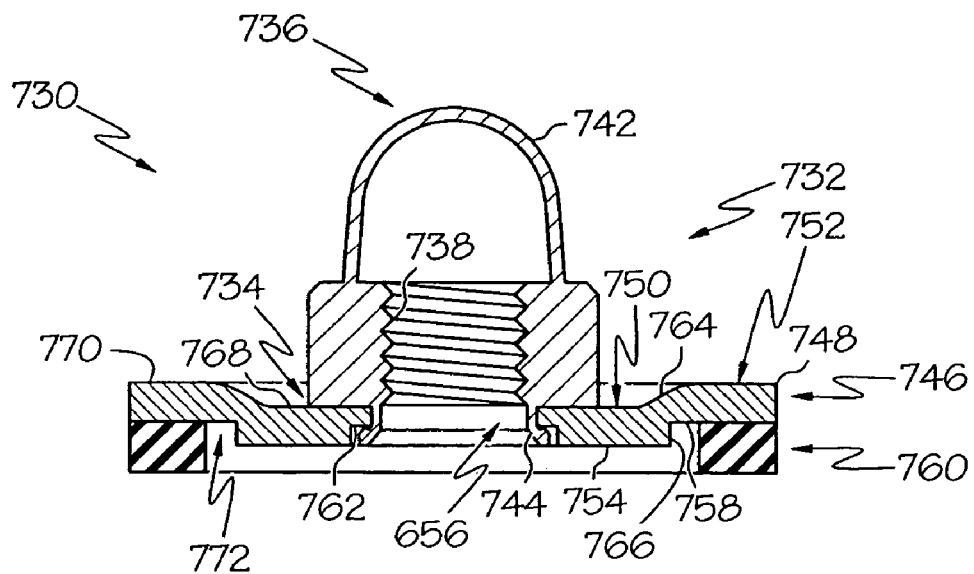
FIG. 11 is sectional view depicting a seal nut assembly in accordance with another embodiment of the present invention.

Turning now to FIG. 11, an alternate seal nut assembly 730 in accordance with the present invention is depicted to include a locking member 732, a bearing member 746 and a resilient member 760. The locking member 732 is shown to include a proximal end 734 and a distal end 736. A cap 742 can be provided adjacent to the distal end 736 and a lip 744 can be provided adjacent to the proximal end 734. The locking member 732 can include a threaded aperture 738 which extends from the proximal end 734 and at least partially to the distal end 736. The bearing member 746 can include an inner annular portion 750 and an outer annular portion 752. The inner annular portion 750 can include an opening 756 which is configured to receive the lip 744 and is further configured to receive a threaded end of a fastener. The locking member 732 can be attached to the bearing member 746 through crimping or other bending of the lip 744 over a ledge 762 provided adjacent to the opening 756 on the bearing member 746. The bearing member 746 can include a first lower surface 754 which corresponds with the inner annular portion 750, and can further include a second lower surface 758 which corresponds with the outer annular portion 752. The outer annular portion 752 can circumferentially surround the inner annular portion 750 and can extend radially outwardly until reaching an outer perimeter 748. As shown in FIG. 11, the first lower surface 754 can be connected to the second lower surface 758 with a lower depending surface 766, whereby this lower depending surface 766 can be substantially vertical. By providing the lower depending surface 766 in this substantially vertical configuration, a harsher or more rigid step is provided between the first lower surface 754 and the second lower surface 758 than as provided in certain of the foregoing embodiments. Such a configuration can provide an advantage of an increased air gap 772 in certain embodiments so as to accommodate greater lateral expansion of the resilient member 760. The resilient member 760 can be adhesively attached to the second lower surface 758. The bearing member 746 can also comprise a first upper surface 768 which generally corresponds with the inner annular portion 750, as well as a second upper surface 770 which generally corresponds with the outer annular portion 752. The first upper surface 768 can be attached to the second upper surface 770 with an upper depending surface 764 which, in this embodiment, is shown to provide a gradual transition between the first upper surface 768 and the second upper surface 770.

Figure 12:
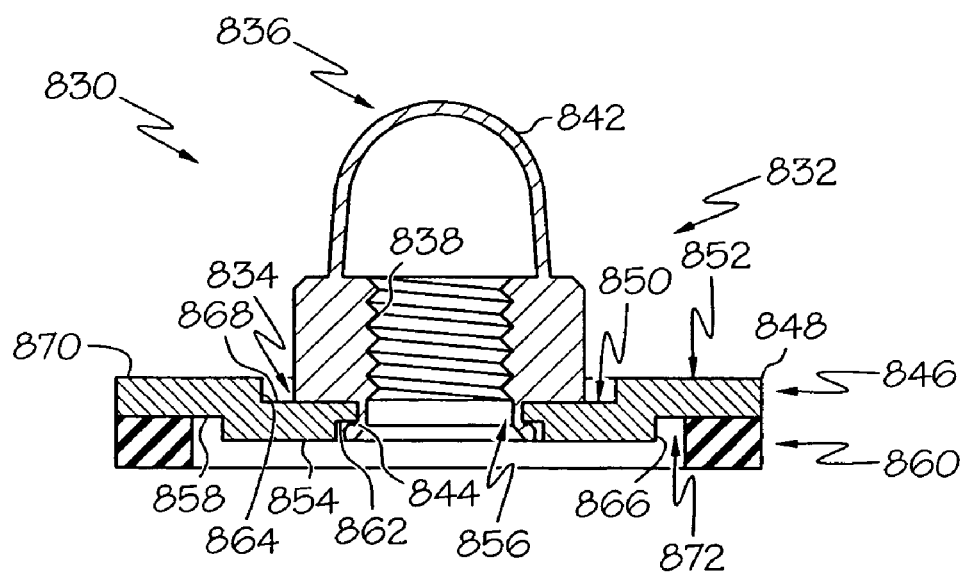
FIG. 12 is sectional view depicting a seal nut assembly in accordance with still another embodiment of the present invention.
Figure 13:
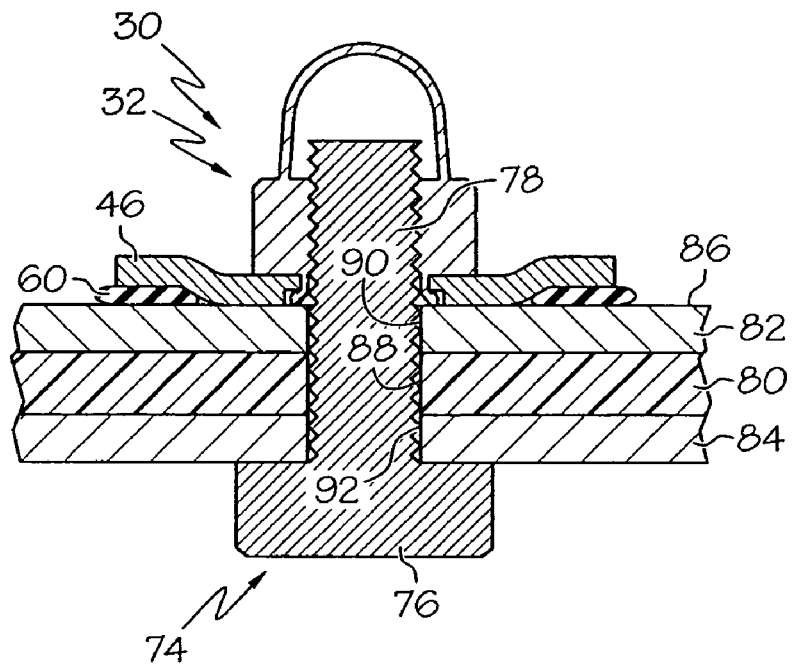
FIG. 13 is a sectional view depicting multiple components being fastened together by a fastener and the seal nut assembly of FIGS. 1-4.

Turning now to FIG. 12, a seal nut assembly 830 in accordance with the teachings of the present invention is depicted to include a locking member 832, a bearing member 846, and a resilient member 860. The locking member 832 can generally extend from a proximal end 834 to a distal end 836, whereby a cap 842 can be provided adjacent to the distal end 836 and a lip 844 can be provided adjacent to the proximal end 834. The locking member 832 can include a threaded aperture 838 which extends from the proximal end 834 and towards the distal end 836. The bearing member 846 can include an inner annular portion 850 and an outer annular portion 852. The inner annular portion 850 can include an opening 856 which is configured to receive the lip 844 and which is further configured to receive a threaded end of a fastener. In order to attach the locking member 832 to the bearing member 846, the lip 844, after being inserted through the opening 856, can be bent or crimped over a ledge 862 provided adjacent to the opening 856 in the bearing member 846. The bearing member 846 can also include a first lower surface 854 which generally corresponds to the inner annular portion 850 and a second lower surface 858 which generally corresponds to the outer annular portion 852. The outer annular portion 852 circumferentially surrounds the inner annular portion 850 and extends radially outwardly until reaching an outer perimeter 848. The resilient member 860 can be attached to the second lower surface 858 (e.g., with adhesive). A lower depending surface 866 can be provided, as similarly discussed above with respect to FIG. 11, to connect the first lower surface 854 with the second lower surface 858. The bearing member 846 can also include a first upper surface 868 which generally corresponds with the inner annular portion 850, and can further include a second upper surface 870 which generally corresponds with the outer annular portion 852. An upper depending surface 864 can connect the first upper surface 868 with the second upper surface 870. As shown in FIG. 12, the upper depending surface 864 can be disposed substantially vertically, as is the lower depending surface 866, which can provide certain manufacturing and/or application advantages as will be appreciated. An air gap 872 is also shown to be provided.

Figure 14:
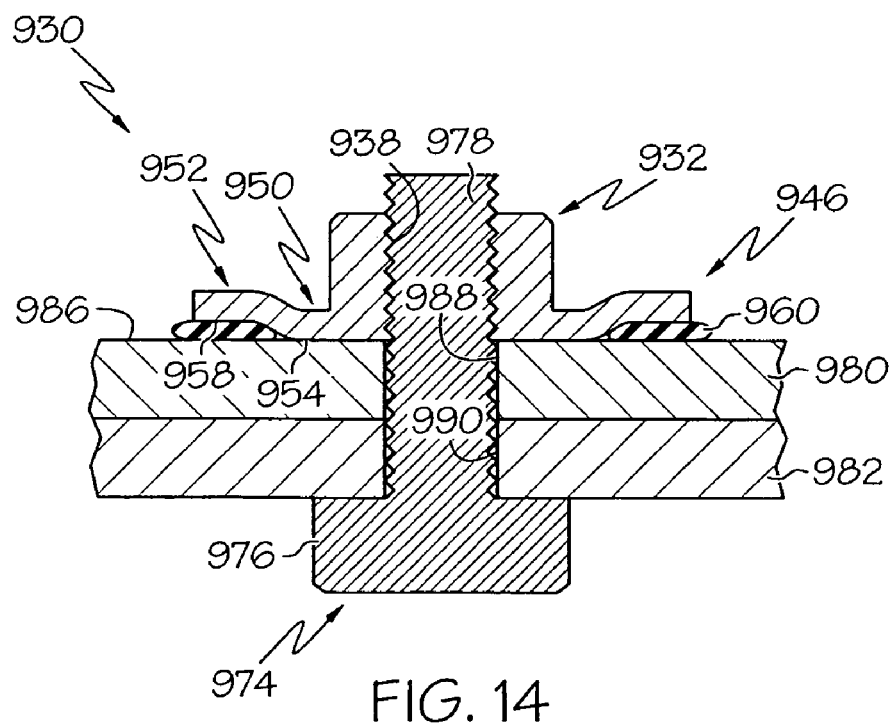
FIG. 14 is a sectional view depicting multiple components being fastened together with a fastener and a seal nut assembly, wherein the seal nut assembly is in accordance with another embodiment of the present invention.
Figure 15:
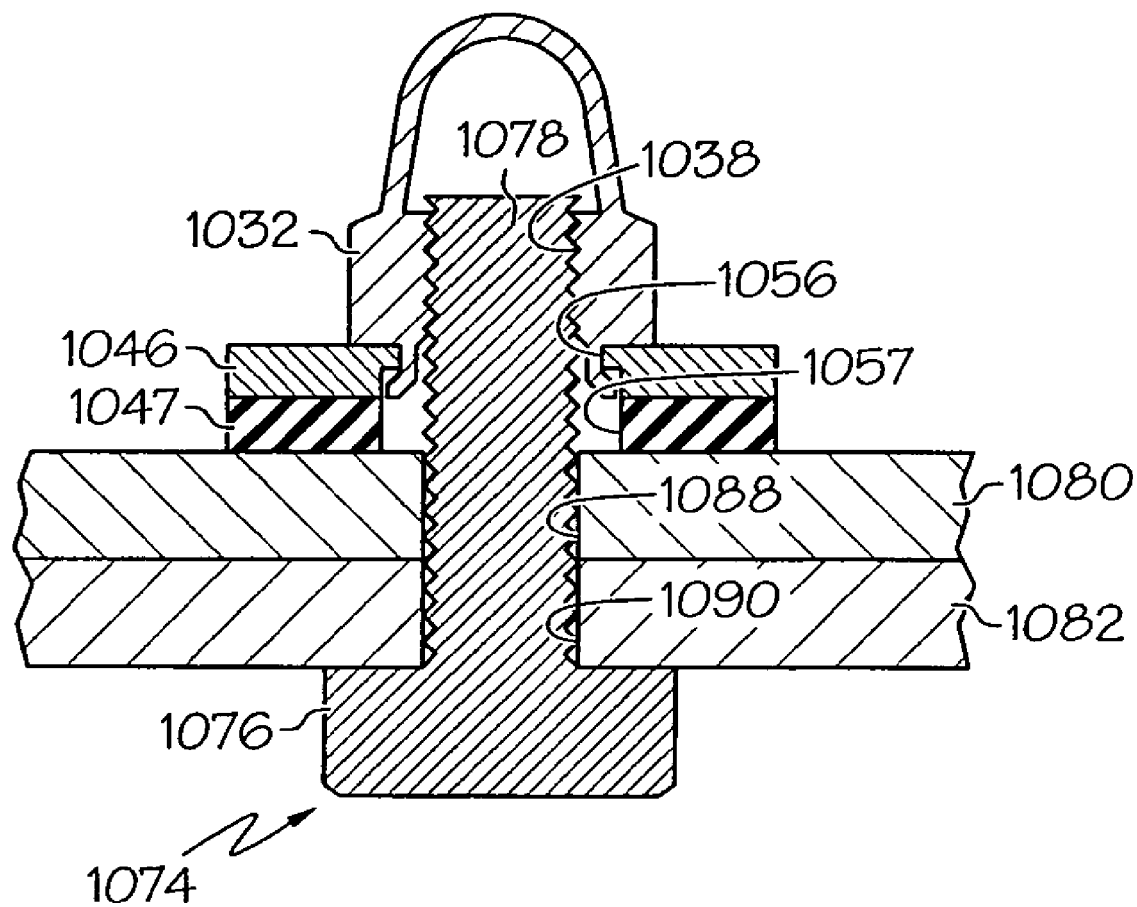
FIG. 15 is a sectional view depicting a conventional fastening arrangement.

Turning now to FIG. 14, another exemplary seal nut assembly 930 is depicted in conjunction with a fastener 974 for joining a first component 980 with a second component 982. In particular, a seal nut assembly 930 is shown to include a locking member 932, a bearing member 946, and a resilient member 960. The fastener 974 includes a head 976 and a threaded shaft 978. The threaded shaft 978 is shown to be inserted through a mounting aperture 990 in the second component 982, through a mounting aperture 988 in the first component 980, and then into a threaded aperture 938 in the locking member 932. Upon tightening of the seal nut assembly 930 upon the fastener 974, a first lower surface 954, which corresponds with an inner annular portion 950 of the bearing member 946, will come into direct contact with a surface 986 provided upon the first component 980, thereby compressing the first component 980 and the second component 982 between the head 976 and the seal nut assembly 930. While in this compressed state, a second lower surface 958 corresponding with an outer annular portion 952 of the bearing member 946 can compress a resilient member 960 against the surface 986, thereby providing an effective seal.

A selected prior art fastening configuration will now be described. In particular, with reference to FIG. 15, a fastener 1074 (e.g., a bolt) can have a head 1076 and a threaded shaft 1078. The threaded shaft 1078 can be inserted through a mounting aperture 1090 in a second component 1082, through a mounting aperture 1088 in a first component 1080, through an aperture 1057 in a rubber washer 1047, through an aperture 1056 in a metal washer 1046, and then into a threaded aperture 1038 in a cap nut 1032. The metal washer 1046 and the cap nut 1032 can together provide a seal nut and can, in some circumstances, be attached together (e.g., by crimping or brazing). The rubber washer 1047 can be bonded (e.g., with adhesive) to at least a portion of a lower surface of the metal washer 1046.

As the head 1076 is rotated with respect to the cap nut 1032, the fastener 1074 and the cap nut 1032 compress therebetween the metal masher 1046, the rubber washer 1047, the first component 1080, and the second component 1082, thereby joining together the first and second components 1080, 1082. When the cap nut 1032 is tightened, compressive force is transmitted to the components 1080, 1082 through the rubber washer 1047. Thus, if the rubber washer 1047 is permanently deformed in a compressed state, a reduced amount of force will be exerted upon the first and second components 1080, 1082 by the cap nut 1032 and the head 1076 of the fastener 1074 due to a reduced total thickness of the stack-up between the cap nut 1032 and the head 1076, wherein the stack-up comprises the first and second components 1080, 1082, the metal washer 1046, and the rubber washer 1047. Permanent deformation or relaxation of the rubber washer 1047 can thereby result in a loose connection between the first component 1080 and the second component 1082.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A seal nut assembly comprising:
   a locking member having a proximal end and a distal end spaced along a longitudinal axis, the locking member defining a threaded aperture extending along the longitudinal axis from the proximal end towards the distal end, the locking member being exteriorly provided with a grip surface;
   a bearing member radially bounded by an outer perimeter and comprising an inner annular portion and an outer annular portion, the outer annular portion radially circumscribing the inner annular portion and extending to the outer perimeter, the inner annular portion comprising a first lower surface for bearing against a component and a first upper surface and defining an opening, and the outer annular portion comprising a second lower surface and a second upper surface, the second lower surface being stepped with respect to the first lower surface, the second upper surface being stepped with respect to the first upper surface, wherein the bearing member is disposed adjacent to the proximal end of the locking member such that the opening is aligned with the threaded aperture of the locking member; and
   a resilient member attached to the second lower surface of the bearing member adjacent to the outer perimeter of the bearing member; wherein
   the inner annular portion is generally planar and the first upper surface is in contacting engagement with the locking member; and
   the outer annular portion is generally planar and the generally planar inner annular portion extends radially outwardly from the opening to the step between the generally planar inner annular portion and the generally planar outer annular portion and includes a radially inward portion directly below the locking member.

2. The seal nut assembly of claim 1 wherein the locking member comprises a cap adjacent to the distal end.

3. The seal nut assembly of claim 1 wherein the locking member is separately formed from the bearing member.

4. The seal nut assembly of claim 3 wherein the locking member is attached to the bearing member.

5. The seal nut assembly of claim 4 wherein the locking member is removably attached to the bearing member.

6. The seal nut assembly of claim 5 wherein the locking member comprises a lip extending adjacent to the proximal end, and the bearing member comprises a ledge, the lip engaging the ledge such that the locking member and the bearing member are attached to one another.

7. The seal nut assembly of claim 4 wherein the locking member comprises a cap adjacent to the distal end.

8. The seal nut assembly of claim 1 wherein the resilient member is adhesively attached to the second lower surface of the bearing member.

9. The seal nut assembly of claim 1 wherein the second lower surface is substantially parallel with the first lower surface.

10. A vehicle comprising:
    a first component having a first mounting aperture;

a second component having a second mounting aperture;

a fastener having a threaded shaft, the threaded shaft sized to be received by the first mounting aperture and the second mounting aperture;

a seal nut assembly configured for selective engagement with the threaded shaft, the seal nut assembly comprising:

a locking member having a proximal end and a distal end spaced along a longitudinal axis, the locking member defining a threaded aperture extending along the longitudinal axis from the proximal end towards the distal end, the locking member being exteriorly provided with a grip surface;

a bearing member radially bounded by an outer perimeter and comprising an inner annular portion and an outer annular portion, the outer annular portion radially circumscribing the inner annular portion and extending to the outer perimeter, the inner annular portion comprising a first lower surface and a first upper surface and defining an opening, and the outer annular portion comprising a second lower surface and a second upper surface, the second lower surface being stepped with respect to the first lower surface, the second upper surface being stepped with respect to the first upper surface, wherein the bearing member is disposed adjacent to the proximal end of the locking member such that the opening is aligned with the threaded aperture of the locking member; and a resilient member associated with the second lower surface adjacent to the outer perimeter; wherein the threaded shaft extends through the first mounting aperture and the second mounting aperture and is threadably received in the threaded aperture of the locking member such that the second component is attached to the first component, with the resilient member and the first lower surface of the bearing member in direct contact with the second component;

the inner annular portion is generally planar and the first upper surface is in contacting engagement with the locking member; and the outer annular portion is generally planar and the generally planar inner annular portion extends radially outwardly from the opening to the step between the generally planar inner annular portion and the generally planar outer annular portion and includes a radially inward portion directly below the locking member.

11. The vehicle of claim 10 wherein at least one of the first component and the second component comprises at least part of a truck bed.

12. The vehicle of claim 10 wherein the locking member comprises a cap adjacent to the distal end.

13. The vehicle of claim 12 wherein the locking member comprises a lip extending adjacent to the proximal end, and the bearing member comprises a ledge, the lip engaging the ledge such that the locking member and the bearing member are coupled together.

14. The vehicle of claim 10 wherein the resilient member is adhesively attached to the second lower surface of the bearing member.

15. A seal nut assembly comprising:

a cap nut defining a threaded aperture;

a bearing member attached to the cap nut and comprising a generally planar inner annular portion and a generally planar outer annular portion, the generally planar inner annular portion comprising a first lower surface and defining an opening, the opening aligned with the threaded aperture of the cap nut, the generally planar outer annular portion radially circumscribing the generally planar inner annular portion and comprising a second lower surface, the second lower surface being stepped with respect to the first lower surface; and a resilient member attached to the second lower surface wherein each of the resilient member and the first lower surface are configured to directly contact a mounting structure; wherein the generally planar inner annular portion extends radially outwardly from the opening to the step between the generally planar inner annular portion and the generally planar outer annular portion and includes a radially inward portion directly below the cap nut;

the generally planar inner annular portion further comprises a first upper surface;

the generally planar outer annular portion further comprises a second upper surface, the second upper surface being stepped with respect to the first upper surface;

the cap nut is in contacting engagement with the first upper surface and is radially inward of the second upper surface; and at least a portion of the cap nut is positioned longitudinally between the first upper surface and the second upper surface when the seal nut assembly is untightened relative to a mating threaded member.

16. The seal nut assembly of claim 15 wherein the bearing member is separately formed from the cap nut.

17. The seal nut assembly of claim 16 wherein the cap nut comprises a lip and the bearing member comprises a ledge, the lip engaging the ledge such that the locking member and the bearing member are attached to one another.

18. The seal nut assembly of claim 15 wherein the resilient member is adhesively attached to the second lower surface.

19. A seal nut assembly, comprising:

a nut having an outer perimeter;

a washer joined to the nut, the washer comprising a generally planar outer perimeter portion and a generally planar inner annular portion defining an opening and extending radially outwardly from the opening beyond the outer perimeter if the nut to a step between the generally planar inner annular portion and the generally planar outer perimeter portion, the generally planar inner annular portion including a radially inward portion directly below the nut, including a lower surface for bearing against an adjacent structure; and a seal bonded to a lower surface of the generally planar outer perimeter portion of the washer;

wherein when the seal nut assembly is installed onto a threaded member the seal contacts a surface of the adjacent structure, thereby forming a fluid seal, and the compressive force exerted by the seal nut assembly is transmitted directly to the adjacent structure by the generally planar inner annular portion of the washer.

20. The seal nut assembly, of claim 19, wherein:

the nut comprises a cap nut.

* * * * *

UNITED STATES PATENT AND TRADEMARK OFFICE
CERTIFICATE OF CORRECTION

| | | |
|---|---|---|
| PATENT NO. | : 7,581,913 B2 | Page 1 of 1 |
| APPLICATION NO. | : 11/338273 | |
| DATED | : September 1, 2009 | |
| INVENTOR(S) | : Anthony Ordonio, Jr. et al. | |

It is certified that error appears in the above-identified patent and that said Letters Patent is hereby corrected as shown below:

Claim 19, Column 16, line 46, change "if" to --of--.

Signed and Sealed this

Twenty-seventh Day of October, 2009

David J. Kappos
*Director of the United States Patent and Trademark Office*